Feb. 2, 1971   E. CHU   3,559,241
APPARATUS FOR PRODUCING A HOLLOW STRIP OF POLYMERIC MATERIAL
Filed May 31, 1968
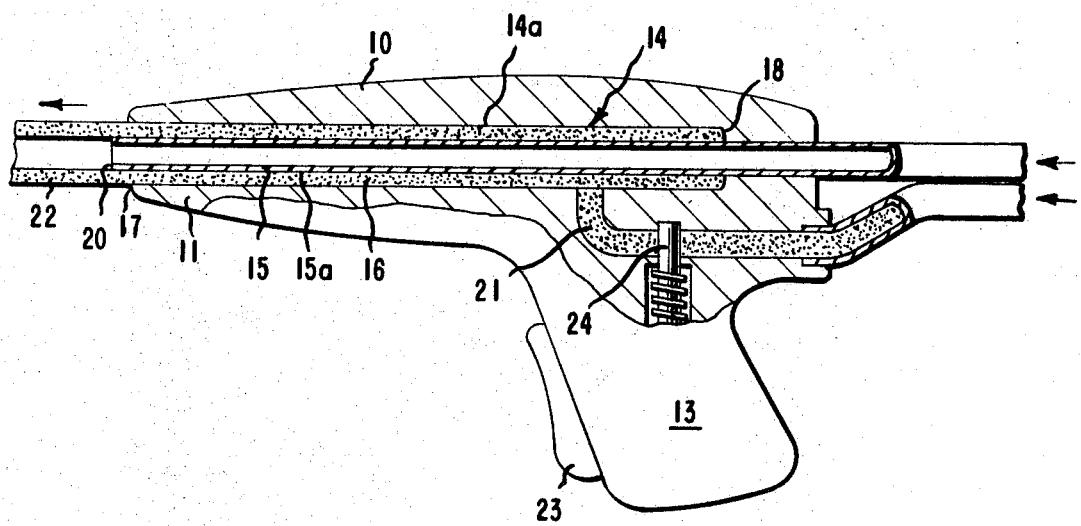
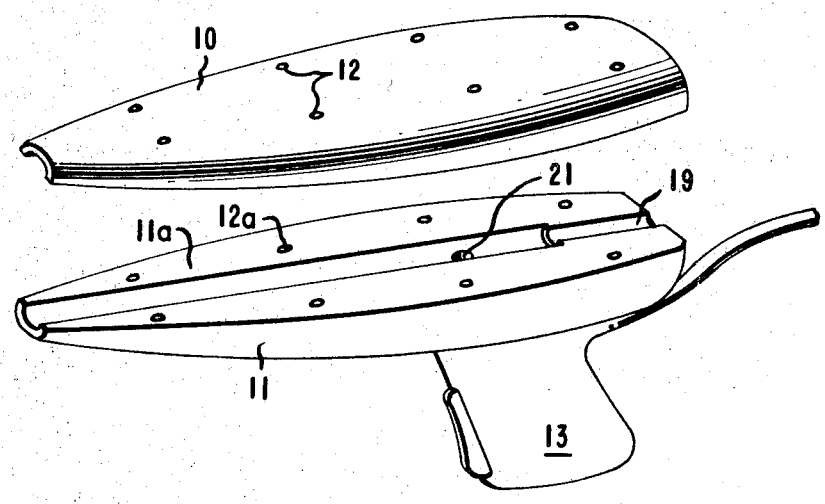
INVENTOR
EDWARD CHU
BY  *Melville J. Hayes*
AGENT

United States Patent Office

3,559,241
Patented Feb. 2, 1971

3,559,241
APPARATUS FOR PRODUCING A HOLLOW STRIP OF POLYMERIC MATERIAL
Edward Chu, Philadelphia, Pa., assignor to E. I. du Pont de Nemours and Company, Wilmington, Del.
Filed May 31, 1968, Ser. No. 733,583
Int. Cl. B29d 23/04
U.S. Cl. 18—14                                2 Claims

ABSTRACT OF THE DISCLOSURE

The disclosure describes an apparatus which is adapted for use in producing a hollow strip or tube of polymeric material of any desired length from a fluid polymeric composition; the apparatus preferably is a gun-like device which can be held by a person and operated with one hand during extrusion of the product from the front (discharge) end; the apparatus comprises (A) a chamber (e.g. a cylinder) for holding a pressurized fluid, for example a thixotropic polymeric composition, (B) a mandrel (e.g. a tube) mounted within chamber (A) to form an extrusion chamber between the sidewall of chamber (A) and the outer wall of mandrel (B), the front end of mandrel (B) extending a short distance beyond the front end of chamber (A), and (C) a duct means for introducing a fluid polymeric composition into the rear portion of said extrusion chamber.

BACKGROUND OF THE INVENTION

This invention relates to an apparatus which is adapted for use in producing a hollow strip or tube of polymeric material of any desired length from a fluid polymeric composition (e.g. a thixotropic paste). A preferred embodiment of the apparatus is adapted to be held in one hand while it is employed for extruding a hollow polymeric strip onto a substrate, somewhat in the manner that an ordinary caulking gun is used.

Hand-held gun-type devices are known in the art which are adapted for the production of a solid strip of polymeric material from a fluid polymeric composition, and which can be held in one hand while the extruded polymeric strip flowing from the apparatus outlet is applied to a substrate. Although such devices are very useful for a number of caulking and sealing applications, their utility is quite limited in certain situations. For example, when the polymeric strip is extruded into a crevice of a sidewalk, building foundation or the like, it is often difficult to obtain the desired intimate contact and permanent bond between the polymeric strip and the walls of the crevice. Also, the limited slump resistance of the extruded solid strip is a problem in some applications. For these and other reasons, which will be apparent to those skilled in the art, there is a very real need for an apparatus which can produce a hollow strip of polymeric material from a fluid polymeric composition, and preferably such an apparatus which can be held in one hand while the extruded hollow strip flows from the apparatus outlet onto or into the article to be caulked or sealed.

SUMMARY OF THE INVENTION

The present invention, in a broad sense, provides an apparatus which is adapted for use in producing a hollow strip or tube of material from a fluid polymeric composition, and which comprises (A) an elongated chamber capable of holding a fluid under super-atmospheric pressure,
(B) an elongated mandrel member having a cross sectional area smaller than that of chamber (A), and mounted substantially coextensively within chamber (A) so that an extrusion chamber is formed between the side wall of chamber (A) and the outer wall of member (B),
said extrusion chamber being open at one end and and closed at the other end,
one end of member (B) extending beyond the end of chamber (A) at the open end of said extrusion chamber, and the other end of member (B) extending at least to the closed end of said extrusion chamber, and
(C) duct means communicating with said extrusion chamber and adapted for introducing a fluid polymeric composition under super-atmospheric pressure into said extrusion chamber, at a location remote from its open end, from a source of supply of said composition.

BRIEF DESCRIPTION OF THE DRAWING

The invention will be more readily understood by referring to the attached drawings wherein:

FIG. 1 shows in central vertical section and partially in side elevation an embodiment of the apparatus having the outward appearance of a gun; the apparatus is shown here in the assembled and operating state, and a tube of fluid polymeric material is flowing from the outlet or open end of the extrusion chamber.

FIG. 2 is perspective view of the apparatus of FIG. 1 wherein the upper portion of the gun body has been separated from the lower portion at a certain horizontal plane, and the tubular mandrel member has been removed from the elongated chamber to show the floor of the chamber in perspective.

DESCRIPTION OF PREFERRED EMBODIMENT

The extrusion apparatus or "gun" shown in FIG. 1 has a gun body made up of an upper portion 10 and a lower portion 11; as shown in FIG. 2, these two boat-shape portions are made so as to fit sealingly together when the lower face of portion 10 is placed in contact with the upper face 11a of portion 11. It is apparent from FIG. 2 that body portions 10 and 11 can be locked together by means of bolts (not shown) inserted through holes 12 and 12a in the body portions. Gun handle 13 is fastened to the bottom of the gun body by means of screws or other suitable known fastening means.

It can be seen in FIG. 1 that the extrusion gun contains an elongated cylindrical chamber 14 capable of holding a fluid under super-atmospheric pressure. A tubular mandrel 15 having a diameter smaller than that of chamber 14 is mounted coaxially and substantialy coextensively within chamber 14 so that an extrusion chamber 16 is formed between the sidewall 14a of chamber 14 and the outer wall 15a of mandrel 15. A solid mandrel (not hollow) can also be used, especialy when the product is allowed to flow from the gun outlet rather slowly. Extrusion chamber 16 is open at its front or outlet end 17 and closed at its back end 18. Bore 19 (FIG. 2) in the back portion of the gun body locks mandrel 15 in position; the locking of the mandrel in position can be enhanced if desired by various means (not shown), for example by providing bore 19 with a locking screw or O-ring, or by providing locking pins which extend through the upper and lower portions of the gun body in perpendicular contact with mandrel wall 15a. The front end 20 of mandrel 15 extends a short distance beyond the front end 17 of the extrusion chamber (i.e. the front end of body portions 10 and 11.)

Duct 21 communicates with extrusion chamber 16 and is adapted for introducing one or more fluid polymeric compositions under super-atmosphere pressure into the extrusion chamber from a source of supply of the composition (not shown). The composition flows from outlet 16 as a tubular extrusion 22; this extruded product is sometimes referred to as a hollow polymeric strip or bead. The portion of mandrel 15 at the backend of the gun can be attached to a duct adapted for introducing into the mandrel and into extrusion 22 one or more liquids, gases, strips of porous solid material and the like. The interior of the mandrel can be made up of a plurality of tubes adapted to convey two or more different fluid or solid materials into the interior of the extruded product.

Gun handle 13 has a trigger 23 operatively connected to valve 24 in duct 21 so that the valve can be opened and closed by pressing the trigger.

In certain preferred embodiments of the invention: mandrel 15, at least at its frontened, has an outside diameter of about 0.1–0.5 inch; extrusion chamber 16, at least at its frontened, has a diameter about 0.05–1.0 inch larger than that of the mandrel; and the frontend 20 of the mandrel extends about 0.1–0.5 inch beyond the frontened 17 of the extrusion chamber; thus the apparatus has a mandrel extension value of about 0.1–0.5 inch. One skilled in the art, after reading the present disclosure, will have little or no difficulty in adjusting the mandrel extension value to that which gives the best result for the particular polymer composition, extrusion conditions, and apparatus being employed.

In a preferred use of the apparatus, the fluid polymeric composition flowing through duct 21 into the extrusion chamber is a thixotropic polyurethane composition adapted for conversion to a solidified resilient material soon after the hollow extruded strip 22 leaves outlet 17 or after the hollow strip is applied to a substrate. Such a polyurethane composition can be prepared, for example, by reacting a suitable isocyanate compound with one or more suitable polymeric polyols, and adding a finely-divided bodying agent capable of rendering the composition thixotropic. A volatile organic solvent can also be added. One preferred isocyanate compound is an aliphatic diisocyanate known in the art as "Hylene W"; this compound is described in Bulletin PB-19 from Du Pont's Elastomer Chemicals Department. A typical polyurethane composition useful in this apparatus has a flow rate such that when the flow rate is tested as described in Interim Federal Specification Number TT–S–00230, subsection 4.3.3, a six-ounce cartridge of the composition is emptied in ten seconds under a pressure of 50 p.s.i.; and it has thixotropic characteristics to the extent that it is substantially free of sag when tested as described in subsection 4.3.2 of the same specification number. In a typical use of the apparatus, warm humid air is passed through mandrel 15 while the polyurethane composition is introduced into chamber 16 at a temperature of 25° C. and under a pressure of 40 p.s.i.; the extruded product 22 flows from the gun outlet at a rate of about 200 inches per minute, the front end of the mandrel extending ¼ inch beyond the front end of the extrusion chamber, and the product having an inside diameter of ¼ inch and an outside diameter of $5/16$ inch. The product can be cured by subjecting it to a temperature of 32° C. and relative humidity of 90% for 36 hours.

Those skilled in the art of preparing sealing and caulking compositions will be able to prepare fluid compositions suitable for use in the present apparatus from many different polymers, including polyether urethanes, polyester urethanes, silicones, polysulfides, natural rubber, vinyl chloride polymers, fluorinated elastomers, neoprene and Buna N.

As shown in the drawing, the present apparatus can easily be made so that it can be held in one hand while the same hand operates the means for opening and closing the supply valve in the duct leading to the extrusion chamber. Thus, the operator can have the other hand free for other work, such as adjusting the position of the substrate or adjusting the pressure on the polymer supply drum. If desired, another trigger can be provided in the handle of the gun shown in the drawing for opening and closing a supply valve in a duct leading to the interior of the mandrel. The hand that holds the gun is also easily used to regulate the position of the gun as required for applying the hollow polymeric strip in the desired position on a substrate. If the substrate is stationary, the gun is usually moved along (backwards) at about the same number of inches per minute as the strip is being extruded from the gun. Hollowing polymeric strip extruding guns are readily obtainable according to the present invention which are easy and economical to make, to use and to maintain in working condition.

The apparatus of this invention can be used for extruding a tubular polymeric coating in adherence with the surface of a long or continuous strip of porous material. For example, a continuous strip of foam rubber, cellulose sponge, fabric, cord, yarn or the like can be introduced into the tubular mandrel so that it leaves the front end of the mandrel at about the same rate as the hollow extruded strip; then the fluid polymeric strip is solidified or cured by means suitable to result in a tough adherent coating surrounding the strip of porous material. Caulking and sealing material can be made in this manner; also insulated electrical conduits wherein a copper or aluminum wire is inside the porous strip which receives the extruded polymeric coating.

The apparatus is especially useful for producing, and for applying to a substrate, a hollow strip or tube of polymeric material of any desired length, said strip or tube being formed by said apparatus from a thixotropic polymer paste or other suitable fluid polymeric composition. Using this apparatus, a slump-resistant hollow strip of polymer paste can be extruded into a crevice of a building, highway or other substrate structure; and intimate contact and a permanent bond can be obtained between the hollow strip and the walls of the crevice. The hollow strip tends to have better slump resistance than a non-hollow strip of the same size and composition, and it is less inclined to develop undue shrinkage stresses when cured. Moreover, the hollow strip tends to retain better contact with, and adheres better to, the walls of the crevice during solidification and curing than a non-hollow strip. The hollow strip also requires less of the composition for sealing a given crevice; and it can have the resilience needed to retain adhesion during expansion and contraction of the substrate structure. The apparatus is also useful for applying a hollow polymer strip in interposed adherence with an automobile windshield and the windshield-receiving member of an automobile body.

By employing an embodiment of the apparatus wherein a means to pass pressurized gas through the tubular mandrel is provided, the hollow strip can be placed in intimate pressurized contact with the walls of the crevice regardless of the crevice configuration in a manner that is not possible when using previously known caulking and sealing guns. The pressurized gas can be employed not only for obtaining excellent initial interfacial contact, but also for introducing substances capable of accelerating the solidification and curing of the polymeric material, and even for maintaining a positive pressure within the hollow strip during at least a portion of the solidification or curing period. The pressurized gas, introduced through a constant pressure valve, can also be used to enlarge the diameter of product 22 as it leaves the gun outlet.

I claim:
1. A portable caulking and sealing gun, adapted for use in producing a hollow strip, tube, or layered strip of material from a fluid polymeric composition, comprising
  (A) an elongated cylindrical chamber capable of holding a fluid under super-atmospheric pressure,
  (B) an elongated cylindrical hollow mandrel smaller in diameter than the chamber, and mounted co-axially with the chamber so that an extrusion chamber co-axial with said hollow mandrel and said elongated cylinder is formed between the side wall of the chamber and the outer wall of the hollow mandrel, said extrusion chamber being open at one end and closed at the other end, one end of said hollow mandrel extending about 0.1–0.5 inch beyond the end of the chamber at the open end of said extrusion chamber, and the other end of the hollow mandrel extending at least to the closed end of said extrusion chamber, (C) duct means including a normally closed valve communicating with said extrusion chamber and adapted for introducing a fluid polymeric composition under super-atmospheric pressure into said extrusion chamber, at a location remote from its open end, from a source of supply of said composition, (D) a body portion enclosing said elongated cylindrical chamber and said hollow mandrel having the general exterior configuration of a gun adapted to be held in one hand, and (E) a handle attached to said body portion, said handle containing a trigger operatively connected to said valve in said duct means so that the valve can be opened and closed by pressing said trigger.

2. An apparatus according to claim 1 which also comprises duct means communicating with the interior of said hollow mandrel member and adapted for continuously introducing therein a substance selected from the group consisting of liquids, gases and long strips of porous solid material.

References Cited

UNITED STATES PATENTS

| | | | |
|---|---|---|---|
| 2,666,947 | 1/1954 | Shaw | 18—14 |
| 2,995,159 | 8/1961 | Berggren | 18—3.5X |
| 3,241,186 | 3/1966 | Coons | 18—14 |
| 3,337,914 | 8/1967 | Corbett et al. | 18—14X |
| 3,365,750 | 1/1968 | Donald | 18—14X |
| 2,567,960 | 9/1951 | Myers et al. | 18—3.5 |

ANDREW R. JUHASZ, Primary Examiner

U.S. Cl. X.R.

18—3.5